Figure 1:
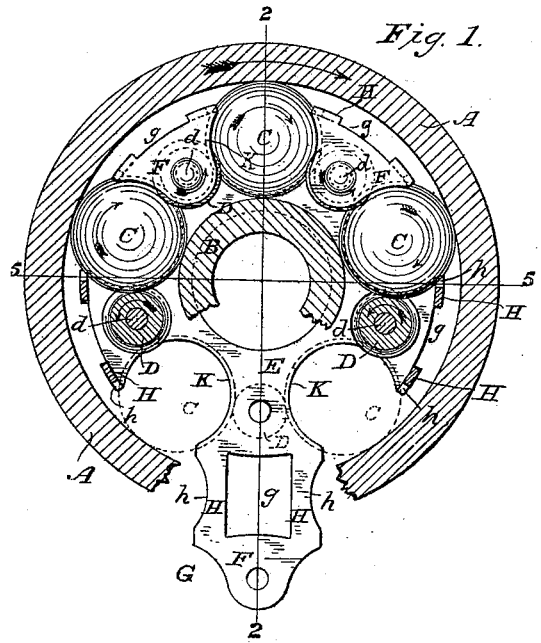

No. 621,219. Patented Mar. 14, 1899.
G. A. BURWELL.
BALL BEARING.
(Application filed Aug. 6, 1898.)
(No Model.)

WITNESSES:
Geo. I. Williams
W. L. Corrie

INVENTOR
George A. Burwell
BY
Wm. A. Skinkle
ATTORNEY.

THE NORRIS PETERS CO., PHOTO-LITHO., WASHINGTON, D. C.

UNITED STATES PATENT OFFICE.

GEORGE A. BURWELL, OF TOLEDO, OHIO.

BALL-BEARING.

SPECIFICATION forming part of Letters Patent No. 621,219, dated March 14, 1899.

Application filed August 6, 1898. Serial No. 688,004. (No model.)

*To all whom it may concern:*

Be it known that I, GEORGE A. BURWELL, a citizen of the United States, residing at Toledo, in the county of Lucas and State of Ohio, have invented certain new and useful Improvements in Ball-Bearings, of which the following is a specification, that will enable those skilled in the art to which my invention pertains to make and use the same.

My invention relates to ball-bearings particularly adapted to bicycles and kindred vehicles, though it may be used in any constructions of mechanism involving the ball-bearing principle. Its objects are to reduce the friction caused by the balls rubbing against each other with their adjacent surfaces moving in opposite directions; and it consists of interposing between each of the balls in a bearing an antifriction-roller which revolves with its surface moving in the same directions as the surfaces of the balls against which it is in contact.

It further consists in a peculiarly-formed frame or cage for supporting these antifriction-rollers and the balls and for holding the balls in their proper positions against accidental displacement, yet in such manner that they may be moved radially by the exertion of slight pressure, the cage being preferably formed of stamped sheet metal, as shown in the drawings.

The drawings show my invention in the best form now known to me, but certain changes, obvious to a skilful mechanic, might be made in the details thereof without departing from the spirit of my invention as set forth in the claims at the end of this specification.

Figure 2:
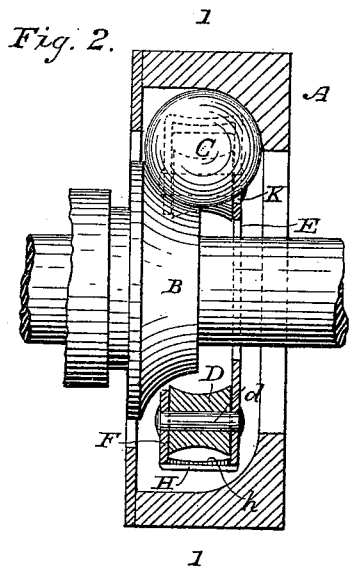
Figure 3:
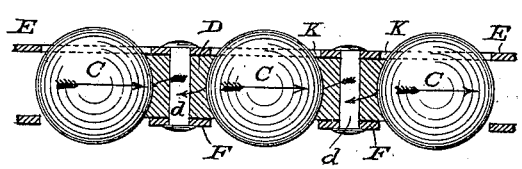
Figures 4, 5:
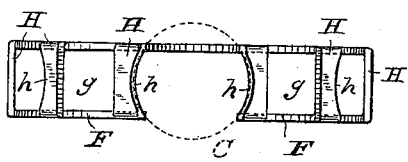

Figure 1 is a view of a ball-bearing embodying my invention, partly in transverse section, on the line 1 1 of Fig. 2, with some of the parts broken away and some shown in their original or primary condition before being bent to final shape, as will be explained farther on. Fig. 2 is a vertical section of the same on the line 2 2 of Fig. 1. Fig. 3 is a diagrammatic view illustrating several balls with antifriction-rollers between them and portions of the supporting-cage. Fig. 4 is a plan or top view of the cage, and Fig. 5 a horizontal transverse section through the same on the line 5 5 of Fig. 1.

In the drawings I have deemed it necessary to show only the ball race or cup A and the cone B of an ordinary ball-bearing. The balls C, five of which are shown, though a greater or less number may be used, lie in contact with and roll upon the opposing surfaces of of the cup and cone, respectively. Between each of these balls is located an antifriction-roller D, having concave peripheries to conform to the surfaces of the balls against which they bear. These rollers are mounted upon pins $d$, the ends of which are supported by a metallic cage or frame E. This cage is preferably formed of stamped sheet metal, with brackets or arms F, which support the outer ends of the pins, upon which the rollers are mounted. These brackets are made integral with the main body of the cage and are first bent at right angles at the outer periphery of the main body and then again at right angles toward the center of the cage, so as to embrace the outer end of the antifriction-rollers, as shown in the drawings. The original form of these arms or brackets as they are stamped from the sheet metal is shown at G, Fig. 1.

The central portion of each arm is cut away for the purpose of lightness and resiliency, leaving an aperture $g$, with arms H H at each side of it, which support the outer end F of the bracket. The outer side of each of these arms is cut away or formed with a curved indenture $h$, corresponding approximately to the curvature of the balls.

It will be observed by reference to Fig. 4 that when the arms or brackets are bent over to their final position the opening between the curved opposed surfaces of adjacent arms is slightly smaller in width than the diameter of the ball C, which is shown by dotted lines. As the cage is made of very light or springy metal the balls C can be forced through these openings by slight pressure, which forces the arms aside, and when they are once in place the arms spring back, so that the balls are held in position against accidental displacement, and yet they can be withdrawn when desired by the application of sufficient force to again spring the arms. By this means I am able to remove the cage, with the balls and its antifriction-rollers, as an entirety from a bearing without the balls necessarily escaping from the cage. This I find is a great convenience not only in original manufacture, but for purposes of repairing, &c. Below these arms the metal of the body of the cage is cut away to form circular openings K at the side of each ball, through which openings the balls project without contact with the sides of the cage, or, in fact, any portion of it, when they are in working position between the cone and cup.

As illustrated, the balls are held in position laterally by the concave peripheries of the antifriction-rollers between them, so that when the balls are in working positions in the bearing between the cone and the cup they are absolutely out of contact with the cage at every point, touching only the cone and its surfaces and also the surfaces of the antifriction-rollers, which latter hold the cage in proper position out of contact with the balls. The balls therefore have absolutely free rolling contact with the cone and the cup and also with the antifriction-rollers which revolve in unison with them; but the balls do not touch or rub against any portion of the cage which supports the rollers or against any moving surface rolling in opposition to them, thus resulting in a great reduction in the friction existing in ball-bearings as commonly constructed.

Having thus described my invention, what I claim as new, and desire to secure by Letters Patent, is—

1. In a ball-bearing, the combination of the bearing-balls, the separating-rollers having concave peripheries located between the balls and the pivot-pins on which the rollers are mounted with a suitable revoluble frame or cage which supports the pivot-pins of the rollers, substantially as set forth.

2. In a ball-bearing, the combination of the bearing-balls, the separating-rollers having concave peripheries located between the balls and the pivot-pins on which the rollers are mounted, with a suitable revoluble frame or cage which supports the roller-pins and retains the balls against accidental displacement, substantially as set forth.

3. In a ball-bearing, the combination of the bearing-balls, the separating-rollers having concave peripheries located between the balls and the pivot-pins, on which the rollers are mounted, with a revoluble frame or cage composed of a disk having suitable apertures K, at its sides through which the sides of the balls partially project and having slightly-yielding overhanging arms or brackets which support the outer ends of the pivot-pins, with peripheral apertures or openings formed between the adjacent sides of said overhanging arms slightly less in width than the diameters of the balls, substantially as and for the purpose set forth.

In testimony whereof I affix my signature, in the presence of two witnesses, at Toledo, Ohio, July 11, 1898.

GEORGE A. BURWELL.

Witnesses:
A. WILSON,
H. S. LEYMAN.